(No Model.) 2 Sheets—Sheet 2.
J. A. & F. M. HARMON.
SEED PLANTER AND FERTILIZER DISTRIBUTER.
No. 576,575. Patented Feb. 9, 1897.
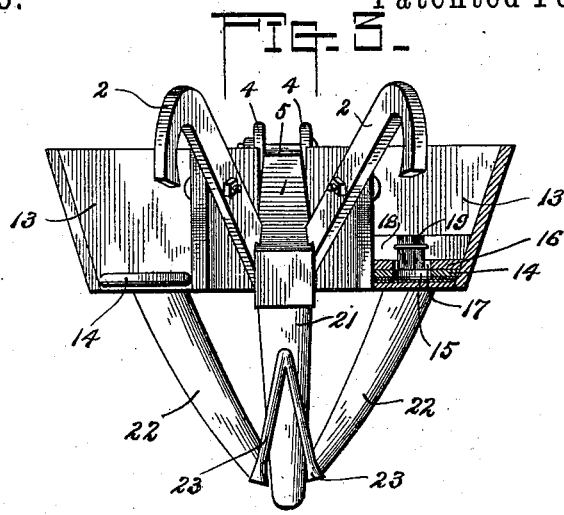
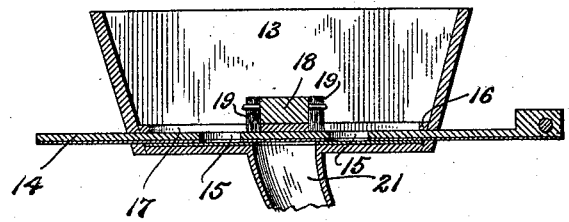
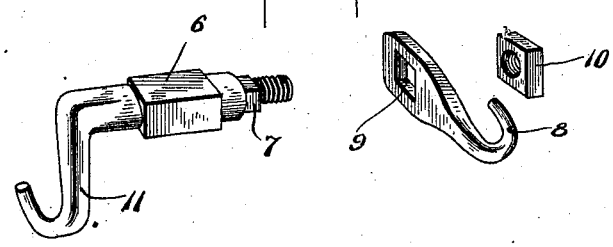
Witnesses
A. M. Poynton
V. B. Hillyard
Inventors
James A. Harmon and
Frank M. Harmon,
By their Attorneys,
C. A. Snow & Co.

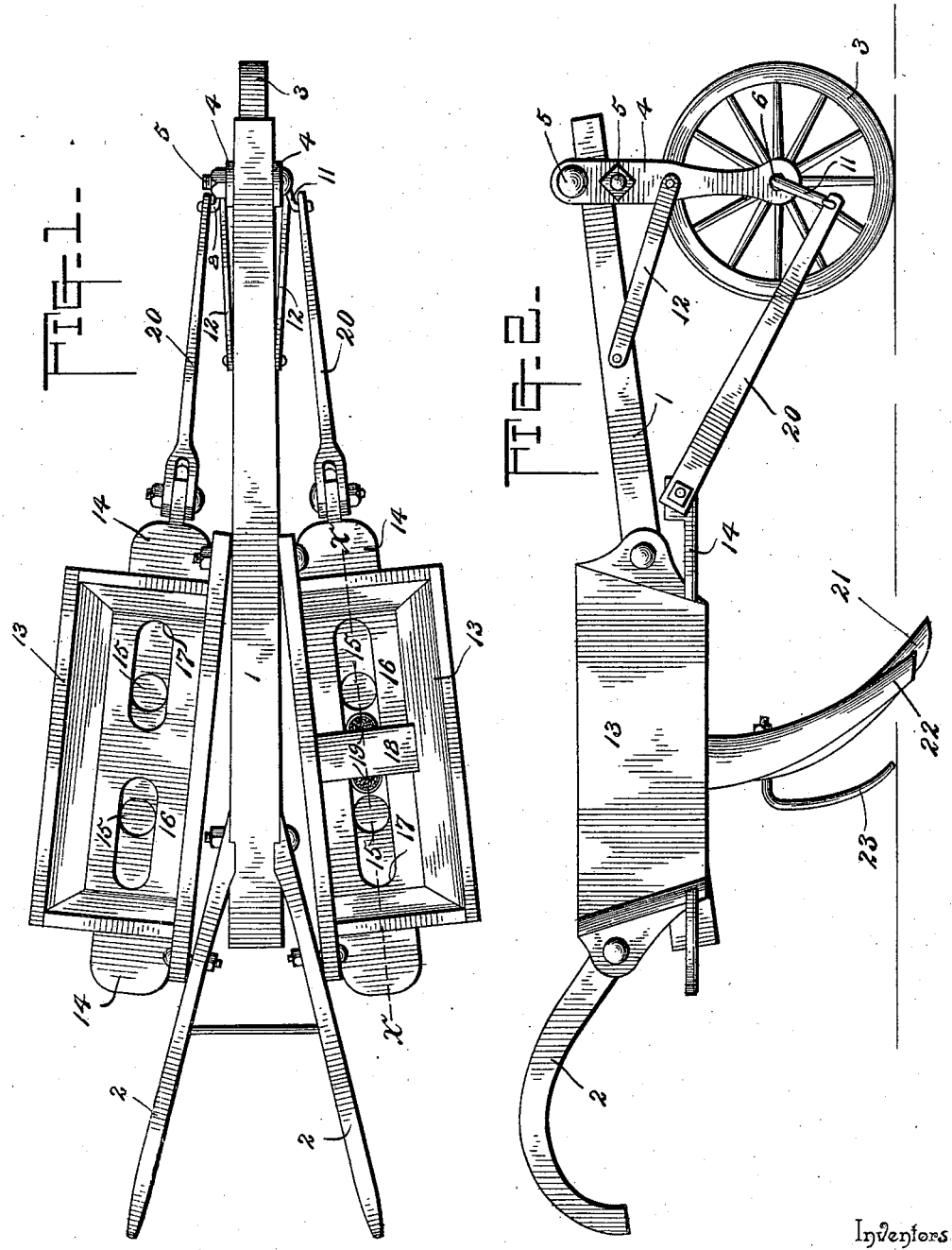

UNITED STATES PATENT OFFICE.

JAMES A. HARMON AND FRANK M. HARMON, OF ALBANY, TENNESSEE.

SEED-PLANTER AND FERTILIZER-DISTRIBUTER.

SPECIFICATION forming part of Letters Patent No. 576,575, dated February 9, 1897.

Application filed May 28, 1896. Serial No. 593,462. (No model.)

*To all whom it may concern:*

Be it known that we, JAMES A. HARMON and FRANK M. HARMON, citizens of the United States, residing at Albany, in the county of Greene and State of Tennessee, have invented a new and useful Planter and Fertilizer, of which the following is a specification.

This invention aims to provide an implement for sowing seed and distributing fertilizer, either independently or at one and the same operation, and which can be regulated to drop any required amount of seed or fertilizer and at any desired distance apart, the machine opening the furrow, depositing the seed or fertilizer, or both, into the furrow, and closing the latter.

For a full understanding of the merits and advantages of the invention, reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a top plan view of a combined planter and fertilizer-distributer constructed in accordance with the principles of this invention. Fig. 2 is a side elevation thereof. Fig. 3 is a rear view, parts being broken away. Fig. 4 is a longitudinal section of a hopper on the line $x\ x$ of Fig. 1. Fig. 5 is a detail view of the crank-axle, showing the means whereby a crank has adjustable connection therewith.

Corresponding and like parts are referred to in the following description and indicated in the several views of the accompanying drawings by the same reference characters.

The beam 1 is controlled by means of handles 2 and is supplied at its front end with a ground-wheel 3. Parallel bars 4 are clamped against the sides of the beam 1 by means of bolts 5 and have bearings at their lower ends in which is journaled a crank-axle 6, upon which is mounted the ground-wheel 3 in such a manner so that the crank-axle and ground-wheel will rotate together. An end of the crank-axle is made angular, as shown at 7, and a crank 8 has an opening 9 of corresponding shape to the angular end 7 to receive the latter, whereby positive connection is had between the crank-axle and the crank, the latter being held in place by an axle-nut 10 placed upon the threaded end of the crank-axle. By this construction provision is had for adjusting the cranks relatively to each other, so that the seed-slides in the hoppers may be operated simultaneously in the same or reverse directions, as required. One of the cranks, as 11, is fixed and is provided by bending an end portion of the crank-axle. Obviously by adjusting the crank 8 the two cranks may be caused to register, to set oppositely, or be moved to occupy any relative angular adjustment according to the required movement of the seed-slides. The parallel bars 4 are strengthened by braces 12.

The hoppers 13 are duplicates in point of construction and are secured to opposite sides of the beam 1. Each hopper has front and rear ears at its inner side, which ears receive the fastenings employed for securing the hoppers in place. A seed-slide 14 reciprocates longitudinally in each hopper and is formed with one or more openings 15 to receive the seed or fertilizer to be dropped.

The size and position of the openings 15 will depend upon the amount and distance apart at which it is desired to effect the dropping of the seed or fertilizer, and if it be required to plant with great frequency a series of openings 15 will be provided to deliver a charge to the grain-spout a number of times at each stroke of a seed-dropping slide.

A false bottom 16 is located above the dropping-slide of the hoppers and has a longitudinal slot or slots 17, which are in vertical alinement with the openings 15. A block 18 is mounted centrally upon the false bottom and has brushes 19, which extend into the slot or slots 17 and touch the top side of the dropping-slide, so as to sweep off the surplus grain, thereby insuring a given amount being dropped each time an opening 15 registers with the seed-spout. Pitmen 20 connect the front ends of the dropping-slides with the respective cranks 8 and 11. The dropping-slides are preferably wooden slats and are strengthened and reinforced by sheet-metal strips fitted thereto, the metallic surface also serving to receive the wear incident to the movement of the slides. The top side of the bottom proper of each hopper is metal-lined for a purpose similar to covering the dropping-slides with metal.

The furrow-opener 21 is secured to the rear portion of the beam 1 about in transverse alinement with the seed-spouts 22 and may be of any desired construction. The seed-spouts 22 communicate at their upper ends with the discharge-openings provided in the bottom of the hoppers and incline forwardly and inwardly toward their lower ends and are secured at or near their lower extremities to the furrow-opener and are braced by the latter. These seed-spouts or delivery-tubes 22 have their lower ends disposed with relation to each other and the furrow-opener so as to discharge the grain and fertilizer singly or together into the furrow formed by the opener 21.

The coverers 23 for closing the furrow after the dropping of the seed or fertilizer may be of any approved construction and are attached to and carried by the furrow-opener, thereby enabling them to be comparatively short, so as to obviate the employment of braces or stays for strengthening. The coverers converge toward their upper ends and merge into a shank which passes through and makes connection with the furrow-opener, and the lower or active ends of the coverers track upon opposite sides of the furrow, so as to cover the seed in the rear of the opener. The active ends of the coverers terminate in a higher plane than the active end of the opener, so as to disturb the ridges of loose earth at the sides of the furrow and effect a closing of the latter and a leveling of the earth.

When it is required to deposit either grain or fertilizer solely, one or the other hopper may be thrown out of operation either by disconnecting the pitman or omitting to supply the said hopper, and when grain and fertilizer are to be dropped at the same time the cranks 8 and 11 are relatively adjusted to deposit the seed and fertilizer in the same hill or drop them alternately, according to the nature of the existing conditions.

Having thus described the invention, what is claimed as new is—

In a planter, the combination of independent dropping-slides, a ground-wheel, an axle supporting the ground-wheel and rotatable therewith, and having an end portion bent to provide an integral crank, and having its opposite end formed with a shoulder, an angular portion, and a threaded terminal, a second crank adjustable to any angle with reference to the integral crank and fitted to the angular portion of the axle, means for securing the adjustable crank in place upon the angular portion of the axle, and pitmen connecting the two cranks with the respective dropping-slides, the parts being combined and arranged that the dropping-slides may be operated simultaneously in the same or opposite directions or at different relative times, substantially as and for the purpose set forth.

In testimony that we claim the foregoing as our own we have hereto affixed our signatures in the presence of two witnesses.

JAMES A. HARMON.
FRANK M. HARMON.

Witnesses:
HENRY CARTE,
WILLIAM BRITTEN.